United States Patent [19]

Suzuki et al.

[11] 4,197,566

[45] Apr. 8, 1980

[54] FLOATING HEAD SLIDER HOLDING APPARATUS AND ITS USE

[75] Inventors: Shigehisa Suzuki; Mitsuo Inumochi, both of Amagasaki, Japan

[73] Assignee: Mitsubishi Denki Kabushiki Kaisha, Tokyo, Japan

[21] Appl. No.: 964,149

[22] Filed: Nov. 28, 1978

[30] Foreign Application Priority Data

Dec. 21, 1977 [JP] Japan ............................... 52-154661

[51] Int. Cl.² ...................... G11B 15/66; G11B 17/32
[52] U.S. Cl. ..................................... 360/103; 360/104
[58] Field of Search ....................... 360/103, 104–105, 360/109; 248/204

[56] References Cited

U.S. PATENT DOCUMENTS

| | | | |
|---|---|---|---|
| 3,593,326 | 7/1971 | Turner et al. | 360/103 |
| 3,864,749 | 2/1975 | Stansell | 360/105 X |
| 3,896,495 | 7/1975 | Beecroft | 360/105 X |
| 4,058,843 | 11/1977 | Gyi | 360/103 |

*Primary Examiner*—John H. Wolff
*Attorney, Agent, or Firm*—Oblon, Fisher, Spivak, McClelland & Maier

[57] ABSTRACT

First and second gimbal springs are used for following precisely a magnetic head slider held by a head holder on a recording surface of a rotating magnetic disc. The head slider is held on a front surface of the first gimbal spring at the center and a pivot is fitted on the center of the second gimbal spring and the end of the pivot is contacted with the rear surface of the first gimbal spring at the center and the first and second gimbal springs are in flat in a free condition. During the working time when contacting the head slider with the recording surface in a floating condition, the gimbal spring in the side of the recording surface is in substantially flat whereas during the non-working time, both gimbal springs are formed to expand to both sides.

6 Claims, 6 Drawing Figures

FLOATING HEAD SLIDER HOLDING APPARATUS AND ITS USE

BACKGROUND OF THE INVENTION

The present invention relates to a floating head slider holding apparatus and its use.

In the conventional magnetic memory apparatus using a magnetic disc, a dynamic pressure type floating head slider has been used. It is necessary to precisely flow a floating head slider on a recording surface of a rotating magnetic disc which is moved in a complicated movement.

It is necessary to use a floating head slider holding apparatus having excellent followability since it is necessary to reduce the floating distance in order to attain a high density recording.

In order to satisfy such requirements, various proposals have been found. One of the typical proposals is to provide a floating type head combining a one sided holding type spring and a pivot.

However, in the preparation of such a loading type head, the spring must be prepared by pivot processing and bending processing is required for fitting a lever to the spring and the lever must be prepared by a complicated bending processing to form a groove for passing a stopper and a lead wire. Moreover, it is not easy to precisely position the lever on the pivot. The contact between the lever and the pivot is shifted depending upon the working of the floating head and accordingly, it is necessary to prevent friction at the contact.

SUMMARY OF THE INVENTION

It is an object of the present invention to overcome the disadvantages of the conventional apparatus.

It is another object of the present invention to provide a floating head slider holding apparatus which can be prepared without bending processing or press processing to form a spring, and which easily permits assembling the spring at the precise position.

Is is the object of the present invention to provide a floating head slider holding apparatus suitable for high density recording which has no friction at a contact between a pivot and a gimbal spring and can be compact and has a good position adjusting function and high shock resistance.

The foregoing and other objects of the present invention have been attained by providing a floating head slider holding apparatus which comprises a floating head slider; a first gimbal spring which holds said slider on the front surface at the center; a second gimbal spring which includes a pivot at the center; and a head holder for holding said first and second gimbal springs under a condition superposing them so as to contact the end of said pivot with the rear surface of said gimbal spring at the center. In the floating head slider holding apparatus, said first and second gimbal springs are formed flat in the free condition to give greater height to said pivot than a gap of said gimbal springs held by said head slider and said first and second gimbal springs are deformed to expand to both sides during the non-working time. In the floating head slider holding apparatus, a gap between said head holder and a recording medium is formed so as to give a substantially flat condition to said gimbal spring in the side of said recording medium during the working time while contacting said floating head slider with said recording medium in a floating condition.

Figure 1:
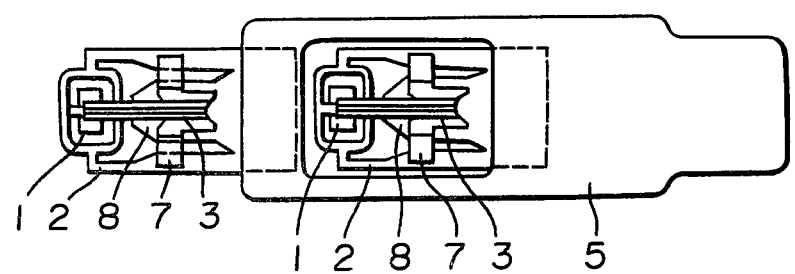
FIG. 1 is a front view of the conventional floating head slider holding apparatus.
Figure 2:
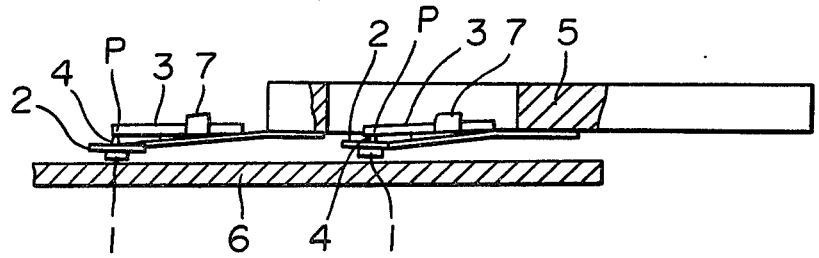
FIG. 2 is a side view of the conventional holding apparatus in a working condition.

DETAILED DESCRIPTION OF THE PREFERRED EMBODIMENTS:

In FIGS. 1 and 2, a head slider (1) formed in one piece with a magnetic head is fixed on a front surface of a position adjusting spring (2) at the central part with an adhesive composition. On the other hand, a pivot (4) is formed on the opposite (rear) surface of the spring. A lever (3) for a load is formed in one piece with a stopper (7) of the position adjusting spring (2). One end of the lever (3) is welded on a lip (8) of the spring (2) and the other end of the lever (3) is disposed so that a top of the pivot (4) formed in the spring (2) is disposed on the center line of the lever (3). Thus, the spring (2) connected to the slider (1) and the lever (3) is fixed on a head holder (5) by caulking.

The conventional floating head slider holding apparatus having said structure is worked by pushing on a magnetic disc (6) as shown in FIG. 2. It is designed to give about 10 g of a load applied to the slider (1) under such a condition. The spring (2) should be prepared by etching a flat plate; forming the pivot; and bending a part for fitting the lever (3). On the other hand, the lever (3) should be prepared by etching a substance and bending it by complicated manners (press processing) so as to form a groove for inserting a stopper (7) and a lead wire (not shown). Moreover, the lever (3) prepared by such complicated processing should be welded by spot welding on the spring (2) after adjusting precisely the position on the pivot formed on the spring with a ruler. Thus, the conventional holding apparatus has various disadvantages requiring precise and complicated processings. In the conventional holding apparatus having such structure, a contact P connecting the lever (3) and the pivot (4) is shifted on the lever (3) depending upon the bending degree of the spring (2) when the free condition is changed to the working condition by pushing on the magnetic disc as shown in FIG. 2 whereby it is necessary to consider ways so as to reduce the friction between the lever (3) and the pivot (4).

Thus, the convention holding apparatus requires complicated processing and assembling and the consideration for preventing friction at the joint P of the pivot.

The present invention is intended to overcome the above-mentioned disadvantages of the conventional holding apparatus and to provide an economical holding apparatus having high reliability.

Figure 3:
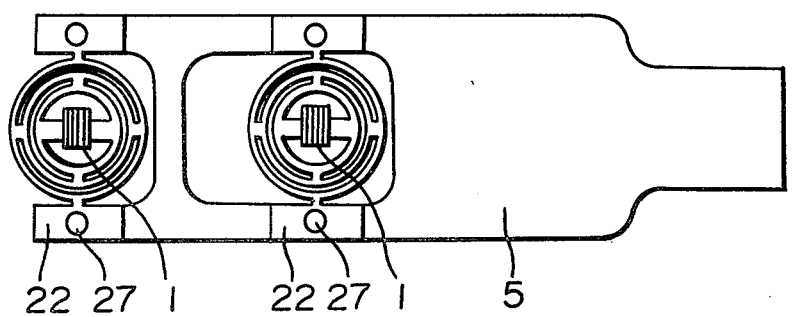
FIG. 3 is a top view of one embodiment of a holding apparatus of the present invention.
Figure 4:
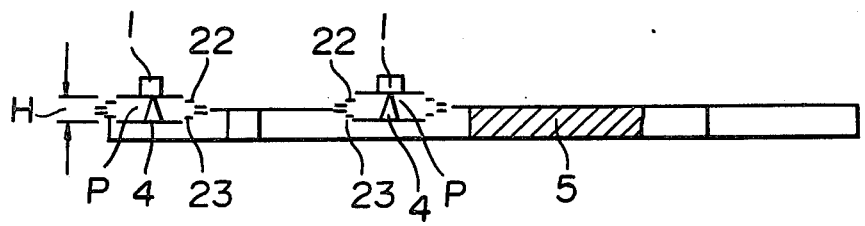
FIG. 4 is a side view of the embodiment of FIG. 3.
Figure 5:
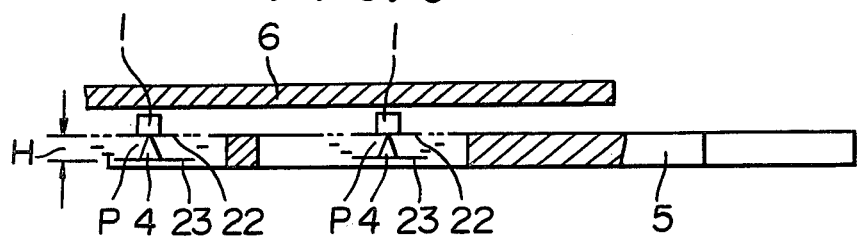
FIG. 5 is a side view of the embodiment of FIG. 3 in a working condition.

Referring to FIGS. 3 to 5 one embodiment of the present invention will be illustrated.

FIG. 3 is a top view of the embodiment of the present invention; FIG. 4 is a side view of the embodiment and FIG. 5 is a side view of the embodiment in the working condition.

The head slider (1) is fixed on a first gimbal spring (22) which has the function of position-adjusting (hereinafter referring to as gimbal spring (22)). The gimbal spring (22) is superposed to a second gimbal spring (23) having a loading function and connecting the pivot (4) at the center (hereinafter referring to as gimbal spring (23)) with a specific gap formed with a spacer at the reference of a fitting hold (27) and both gimbal springs are bonded into one piece by a spot welding and are fixed on the head holder (5) at the fitting hole (27) by caulking etc.

Figure 6:
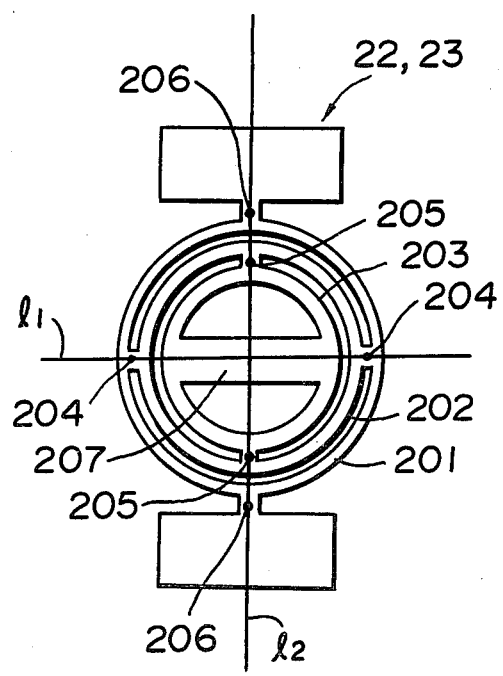
FIG. 6 is an enlarged view of a gimbal spring used in the embodiment of FIG. 3.

The first and second gimbal springs (22,) (23) are flat in free (non-load) condition and have three concentric ring parts as shown in FIG. 6. The outer ring part (201) is connected to the middle ring part (202) by a pair of joints (204) disposed at positions separated by 180 degrees. The middle ring part (202) is connected to the inner ring part (203) by a pair of joints (205) disposed at positions separated by 180 degrees.

The line $l_1$ for passing through a pair of joints (204) is perpendicular to the line $l_2$ for passing through a pair of joints (205). On the line ($l_2$) for passing through a pair of the joints (205), a pair of mounted parts (206) projected to the radial directions from the outer ring part are formed so as to mount on the head holder (5). On the line ($l_1$) for passing through a pair of the joints (204), a fitting part (207) for connecting two parts of the inner ring (203) is formed so as to mount the head slider (1) or the pivot (4) at the center of the fitting part (207).

The mounted parts (206) of the gimbal springs (22), (23) are mounted on the head holder (5) and the head slider (1) is mounted on the fitting part (207). When a load is applied to the fitting part (207) in the direction perpendicular to the plane of the gimbal springs (22), (23) to the mounted parts, (206) the fitting part (207) is shifted to said direction.

In the floating head slider holding apparatus having said structure, the gap between the recording surface of the magnetic disc (6) and the head holder (5) is decided so as to attain the following conditions.

The gimbal springs (22), (23) have their shapes expanded to both sides with reference to the surface of the head holder in the side of the magnetic disc (6) as shown in FIG. 4, under the non-working condition wherein the floating head slider (1) is not contacted with the recording surface of the magnetic disc (6). On the other hand, the gimbal spring (22) in the side of the magnetic disc (6) is flat as shown in FIG. 5, under the working condition wherein the head slider (1) is contacted with the recording surface of the magnetic disc (6) in the floating condition.

The adjustment of the position of the head holder (5) is provided for improving the accuracy of the position of the head slider (1) and maintaining the optimum condition for followability.

The load in the condition can be easily varied by selecting the height H of the pivot (4) and the spring constant of the gimbal spring (23).

The gimbal springs (22), (23) can be prepared by etching each plate and assembling them whereby it is unnecessary to provide the bending processing and the press processing required for the conventional embodiment.

The mutual positions of the gimbal springs (22), (23) can be decided by a simple operation of inserting a pin into the fitting hole (27). Accordingly, it is unnecessary to use a complicated ruler used for the assembling for the conventional embodiment. The gimbal springs (22), (23) can be assembled in a short time. When the gimbal springs (22), (23) having the same shape are used, the mutual positions can be decided in high accuracy and the parts are commonly used to decrease the cost.

The contact P for connecting the pivot (4) and the gimbal spring (22) is not shifted regardless of the bending of the gimbal springs (22), (23). It is unnecessary to take care of friction at the contact P'.

In the embodiment of the present invention shown in FIG. 3, a shape of the spring is simple and can be compact in comparison with those of the conventional embodiment since it is unnecessary to use the stopper (3) and similar devices.

With regard to the function of position adjustment, the position adjusting spring (2) and the lever (3) of the conventional embodiment have shapes for holding by one side whereby a directional function is caused in pitching and rolling movements of the head slider (1). The free movement for 360 degrees on the surface of the head slider can not be given to thereby cause a certain regulation of the pitching and rolling movements.

On the contrary, in accordance with the holding apparatus of the present invention, two gimbal springs having symmetrical joints are used as the gimbal spring (22) for position-adjusting and the gimbal spring (23) for load. Accordingly, when the head slider (1) is pushed on the magnetic disc (6) under certain load as shown in FIG. 5, the gimbal spring (22) for position-adjusting is not substantially bent while adjusting the mutual position of the head slider (1) to the magnetic disc (6). The gimbal spring (23) only applies the load through the pivot (4) to the head slider (1). The gimbal springs do not control the movement of the head slider (1) to thereby attain the free pitching and rolling movements of the head slider (1) around the contact P. Accordingly, the function for the adjustment of the position is remarkably improved to be optimum as the holding apparatus for high density recording which has a small floating distance.

When the holding apparatus is transferred under the condition shown in FIG. 5, even though a certain shock is applied during the transportation, a total returning force to the shifting in the direction departing the head slider (1) from the magnetic disc (6) is the sum of the returning forces of the gimbal springs (22), (23) and any plastic deformation of the gimbal springs (22), (23) is not caused. Thus, the holding apparatus of the present invention has superior stock resistance to that of the conventional holding apparatus.

In the above-mentioned embodiment, a shifting head apparatus having one or more head sliders has been illustrated. Thus, it is possible to attain similar effect in the case of a stationary head apparatus having plural head sliders.

The recording medium is not limited to a magnetic disc and it can be also a magnetic sheet or a magnetic drum. The shape of the gimbal spring is not limited to the circular shape and it can be elliptic or polygonal shape and the positions of the joints are not limited to point symmetrical positions.

The shape of the gimbal spring for position-adjusting is not limited to be the same as that of the gimbal spring for loading and their shapes and thicknesses can be different from each other.

It is not always necessary to mount the gimbal springs at two symmetrical positions to the center of the head holder and it can be mounted in asymmetric or it can be mounted at one position or more than two positions.

The head slider can be a monolithic type or a head slider having thin film head dumbbells. The structure and shape of the head slider are not limited to said structure and shape.

What is claimed as new and desired to be secured by letters Patent of the United States is:

1. In a floating head slider apparatus for a recording medium of a magnetic memory device;
    a first, normally flat, gimbal spring having a front surface and a back surface;
    a head slider attached to the center of said front surface, said head being adapted to float in an orthogonal manner by virtue of said gimbal;
    a second, normally flat, gimbal spring having a front surface and back surface, said second gimbal being substantially identical to said first gimbal;
    a pivot at the geometric center of the back surface of the gimbal portion of said second spring, said pivot having a finite height; and
    a head holder adapted to hold said first and second springs in a superimposed registry spaced apart less than said height so that said pivot contacts the geometric center of the gimbal portion of said back surface of said first spring and deforms both of said springs in opposite directions vis-a-vis said head holder, wherein the juxtaposition of said head slider in floating relation with a moving recording medium causes said first and second springs to reorient themselves with said first spring in its normally flat orientation so that said head achieves desired transducing relation with said recording medium in a substantially frictionless manner.

2. A floating head slider holding apparatus according to claim 1 wherein said first and second gimbal springs are prepared by etching each plate.

3. A floating head slider holding apparatus according to claim 1 wherein said first gimbal spring has the same shape as said second gimbal spring.

4. A floating slider holding apparatus according to claim 1 wherein each of said first and second gimbal springs is formed in point symmetric.

5. A floating head slider holding apparatus according to claim 1 wherein said recording medium is a magnetic disc having a recording surface.

6. The floating head slider apparatus of claim 1 wherein each of said first and second gimbal springs comprises:
    at least three concentric rings;
    at least one pair of first joints spaced 180° apart and connecting two of said rings;
    at least one pair of second joints spaced 180° apart and connecting two of said rings, said second joints being offset from said first joints by 90°;
    an attaching portion of said spring for fitting said floating head slider to said spring, said fitting part being aligned with one of said sets of pairs of joints; and
    a mounting part for mounting said spring on said head holder, said mounting part projecting out of said spring in alignment with the other of said sets of pairs of joints.

* * * * *